United States Patent [19]

Barlow et al.

[11] 4,451,536

[45] May 29, 1984

[54] HEAT DISTORTION-RESISTANT THERMOPLASTIC SEMI-CONDUCTIVE COMPOSITION

[75] Inventors: Anthony Barlow; Lawrence A. Meeks, both of Cincinnati, Ohio

[73] Assignee: National Distillers and Chemical Corporation, New York, N.Y.

[21] Appl. No.: 388,560

[22] Filed: Jun. 15, 1982

[51] Int. Cl.[3] .......................... C08K 3/04; H01B 17/64

[52] U.S. Cl. ............................ 428/383; 174/110 PM; 524/496; 524/523; 524/524; 525/222; 525/227; 525/240

[58] Field of Search ........................ 524/523, 524, 496; 174/110 PM; 525/222, 227, 240; 428/383

[56] References Cited

U.S. PATENT DOCUMENTS

| | | | |
|---|---|---|---|
| 2,953,541 | 9/1960 | Pecha et al. | 174/110 PM |
| 3,375,303 | 3/1968 | Joyce | 174/110 PM |
| 3,849,333 | 11/1974 | Lloyd | 525/222 |
| 3,927,145 | 12/1975 | Gaeckel et al. | 524/524 |

OTHER PUBLICATIONS

Nitta et al. "Treeing Inception Voltage of Polyethylenes: Effect of Blending and of Crosslinking", IEEE Trans. Electr. Insul. vol. EI-13, No. 2 (Apr. 1978) pp. 131-133.

*Primary Examiner*—Veronica P. Hoke
*Attorney, Agent, or Firm*—Kenneth D. Tremain

[57] ABSTRACT

A heat distortion-resistant thermoplastic semi-conductive composition which includes ethylene-vinyl acetate and/or an ethylene acrylate ester copolymer, and an admixture of high density polyethylene and linear low density polyethylene in addition to the electrically conductive component and other additives normally forming part of such compositions.

21 Claims, No Drawings

HEAT DISTORTION-RESISTANT THERMOPLASTIC SEMI-CONDUCTIVE COMPOSITION

BACKGROUND OF THE INVENTION

The present invention relates to a semi-conductive thermoplastic resin composition especially useful as conductive shielding on high voltage cables, and, in particular, to a semi-conductive resin composition which is resistant to heat distortion.

The construction of insulated electrical conductors intended for high voltage applications is well known in the art. Known conductors commonly include one or more strands of a conductive metal or alloy such as copper, aluminum, etc., a layer of insulative material, and a layer of semi-conductive insulation shielding overlying the insulative layer.

The insulation layer and its overlying semi-conductive shielding layer can be formed by what is commonly referred to as a two pass operation or by an essentially single pass operation. The two pass operation is one in which the insulation layer is first extruded and crosslinked if desired, followed by extrusion of the semi-conductive insulation shielding layer onto the previously extruded insulation layer. In order to preclude heat distortion it has been known in the art to crosslink the semi-conductive shielding layer.

In the single pass operation (sometimes called a tandem extrusion when referring only to the insulation layer and its semi-conductive shielding layer), the insulation layer and the overlying semi-conductive insulation shielding layer are extruded in a single operation to minimize manufacturing steps.

The semi-conductive shielding is quite important to the efficiency of the high voltage cable. While most electrical conductors pass voltages well below those where partial electrical discharges from such conductors occur (i.e., the corona effect produced when gas found in the discontinuities in insulative covering ionizes), high voltage cables, wires, etc., require semi-conductive shielding to dissipate the corona effect which reduces the efficiency of the conductor. Consequently, as a result of the need to reduce corona effect and in order to be able to dissipate high voltage concentrations in general, the semi-conductive shielding should have very low electrical resistance. Furthermore, since these high voltage cables may reach temperatures in excess of 70° C. during operation, it is very important that the semi-conductive shielding also be resistant to distortion due to heat.

Also, since it is necessary when splicing and treating the end of an insulated cable having an outer semi-conductive layer to strip the semi-conductive layer in the field from the end of the cable to a certain length thereon, it is advantageous to have an outer semi-conductive layer which does not become brittle in the cold so that the high voltage conductor may be easily spliced and/or connected to electrical hook-ups such as junction boxes.

In U.S. Pat. No. 3,684,821 to Miyauchi, et al., an insulated electric cable is described which has a covering having an insulation layer made of crosslinked polyethylene homo- or copolymer as a principal constituent and a strippable semi-conductive layer composed of 90–10 percent by weight of an ethylene-vinyl acetate-vinyl chloride terpolymer with 10–90% by weight of ethylene-vinyl acetate copolymer having 15–55 percent by weight of vinyl acetate. The resin composition of the semi-conductive layer is combined with, inter alia, di-alpha-cumyl peroxide as a crosslinking agent, a conductivity imparting agent, and, optionally, an antioxidant and processing aids.

U.S. Pat. No. 4,150,193 to Burns, Jr. discloses a vulcanizable semi-conductive composition which provides a strippable semi-conductive shield for insulated electrical conductors wherein the primary insulation is a crosslinked polyolefin, e.g., crosslinked polyethylene. Specifically, the vulcanizable semi-conductive composition described therein includes 40–90 weight percent of ethylene-vinyl acetate copolymer containing 27 to 45 weight percent of vinyl acetate based on the total weight of said copolymer, 3–15 weight percent of a low density, low molecular weight polyethylene homopolymer, 8–45 weight percent of carbon black, and 0.2–5 weight percent of an organic peroxide crosslinking agent.

In each of these references, the resin composition of the semi-conductive shield layer is crosslinked for the purpose of making it resistant to heat distortion, a procedure well known in the art. While these disclosures describe insulative coverings for high voltage conductors which are easily manipulated during splicing operations, nothing disclosed therein suggests a thermoplastic semi-conductive resin for use with insulation for high voltage conductors which is, without the necessity of crosslinking, highly resistant to heat distortion while at the same time retaining low electrical resistance. Furthermore, nothing therein even suggests the use of a good insulation material to achieve high conductivity and a low amount of an electrically conductive component.

Accordingly, it is the purpose of the present invention to provide a semi-conductive shielding composition for a high voltage conductor which possesses the features described above as well as others.

SUMMARY OF THE INVENTION

In accordance with the present invention there is provided a semi-conductive thermoplastic shielding composition which is pliable, resistant to heat distortion, and which exhibits low electrical resistance. Specifically, the present semi-conductive shielding composition is an ethylene-vinyl acetate and/or ethylene-acrylate ester based resin which includes an admixture of linear low density polyethylene (LLDPE) which is an excellent insulation material and high density polyethylene (HDPE) in addition to the normal conductive component and other additives. The LLDPE/HDPE admixture is present in an amount of from about 10 to about 45 weight percent based on the total weight of the composition, and is preferably present in an amount of from about 15 to about 35 percent by weight. As for the composition of the LLDPE/HDPE admixture, the proportion of LLDPE can be from about 40 percent to about 75 percent by weight based on the total weight of the admixture, but is preferably from about 60 to about 70 percent by weight, the remaining portion of the admixture being attributable to the HDPE.

As a result of the present invention, a semi-conductive thermoplastic shielding is provided which is pliable, highly heat distortion-resistant and is low in electrical resistance. In fact, the present invention unexpectedly reduces the amount of the conductive component necessary to maintain the required electrical conductivity thus contributing to a significant reduction in manufacturing cost since the conductive component is normally one of the most expensive ingredients of a semi-conductive shielding material, while at the same time increasing the amount of insulative material included therein.

For example, the amount of carbon black used as the conductive component in the present composition which included the normally highly insulative LLDPE, may be reduced by more than ten percent and still achieve the same conductivity as similar formulations without the substituted LLDPE. In view of the fact that carbon black is a highly reinforcing filler, the performance of the present composition is even more amazing since the loading of carbon black can be significantly reduced while heat distortion is reduced to one-half or one-third of its original value.

Other advantages obtained by the present thermoplastic semi-conductive shielding composition are improved low temperature brittleness and an insignificant increase in the work energy required to process the composition, both which are quite unexpected because of the high crystallinity of linear low density polyethylene. Consequently, a reduction in the cost of manufacturing a high voltage conductor with the present semi-conductive shielding is also realized because of the reduced amount of electrically conductive component required and a generally insignificant increase (less than 5%) in the amount of energy required to process the composition into an end product, e.g., by extrusion or other article forming techniques.

For a better understanding of the present invention, together with other and further objects, reference is made to the following description of the preferred embodiments.

DETAILED DESCRIPTION OF THE INVENTION

The ethylene-vinyl acetate copolymers and/or ethylene-acrylate ester copolymers and the methods of preparing same which can be employed in this invention are well known in the art. When ethylene-vinyl acetate copolymer is employed herein, the copolymer should contain from about 7 to about 45 weight percent of copolymerized vinyl acetate based on the total weight of said copolymer, preferably from about 12 to about 28 percent, and most preferably from about 17 to about 19 percent by weight of this monomer. Copolymers having more than about 45 weight percent vinyl acetate may be too difficult to compound due to their low melting points. The amount of ethylene-vinyl acetate copolymer present in the semi-conductive insulation shielding compositions of this invention can range from about 20 to about 60 weight percent based on the total weight of the composition but is preferably from about 40 to about 50 percent by weight. Of course, it is understood that while it is generally preferred to employ only one type of ethylene-vinyl acetate copolymer in a given composition, the compositions of this invention also include mixtures of two or more ethylene-vinyl acetate copolymers having different amounts of copolymerized vinyl acetate. It is further understood that the useful ethylene-vinyl acetate resins can contain minor quantities, e.g., up to about 10 weight percent of the total polymerizate, of one or more monomers copolymerizable with ethylene and vinyl acetate in replacement of an equivalent quantity of ethylene.

When ethylene-acrylate ester copolymer is used in the present invention, the copolymer should, similarly to the EVA copolymer, contain from about 7 to about 45 percent of copolymerized acrylate ester based on the total weight of said copolymer, preferably from about 12 to about 28 percent, and most preferably from about 17 to about 19 percent by weight of the acrylate ester monomer. The preferred ethylene-acrylate ester copolymers for use herein are ethylene ethyl acrylate and ethylene methyl acrylate, the most preferred copolymer being ethylene ethyl acrylate.

The high density polyethylenes useful in the compositions of the present invention generally have a density of at least 0.94 g/cm$^3$, number average molecular weights of from about $10\times10^3$ to about $12\times10^3$ and a melt index of 9 to 11 when measured according to ASTM-D-1238 at 125° C. Suitable high density polyethylene and methods for their preparation are known in the art as those produced generally by means of catalysts such as chromium oxide promoted silica catalyst and titanium halide-aluminum alkyl catalyst which cause highly structured polyethylene crystalline growth. The literature is replete with references describing such process which will produce HDPE and the particular manner of preparation is immaterial for the purpose of this invention. The amount of HDPE present in the LLDPE/HDPE admixture can range from 60 to 25 percent by weight based on the total weight of said admixture. The HDPE portion of LLDPE/HDPE admixture represents from about 27 to about 4 percent by weight of the total weight of the composition.

The linear low density polyethylene component of the present semi-conductor resin composition is described as a polyethylene having a density of about 0.91 up to about 0.94 g/cm$^3$, number average molecular weights of from about $20\times10^3$ to about $30\times10^3$, and a melt index of 1 to 3 when measured according to ASTM-D-1238 at 125° C. This type of polyethylene, which is generally prepared by low pressure processes, differs from low density polyethylene (LDPE), which is prepared by high pressure processes, in that LLDPE displays higher melting point, higher tensile stress, higher flexural modulus, better elongation, and better stress-crack resistance than LDPE.

Since the introduction of LLDPE on a commercial scale by Phillips Petroleum Company in 1968, several processes for producing LLDPE have been developed, such as slurry polymerization in a light hydrocarbon, slurry polymerization in means, solution polymerization, and gas-phase polymerization. See U.S. Pat. Nos. 4,011,382; 4,003,712; 3,922,322; 3,965,083; 3,971,768; 4,129,701; and 3,970,611. However, as the source of LLDPE is not relevant to the efficacy of the present invention, the process for preparing the LLDPE used in the present thermoplastic semi-conductive composition is not important and should not, therefore, be considered in any way as a limitation.

The employment of carbon black in semi-conductive insulation shielding compositions is well known in the art and any carbon black in any suitable form, as well as mixtures thereof, can be employed in this invention, including channel blacks or acetylene blacks. The amount of carbon black present in the vulcanizable semi-conductive insulation shielding compositions of this invention must be at least sufficient to provide the minimum level of conductivity desired and in general can range from about 20 to about 60 weight percent, and preferably from about 25 to about 35 percent by weight of the total weight of the composition. It may be noted that the level of conductivity commonly required of a semi-conductive covering for a high voltage conductor, e.g., generally characterized by a resistivity of below $5\times10^4$ ohm-cm. at room temperature, can be achieved with a reduced amount of carbon black by use of the present composition—a highly desirable advantage since carbon black is one of the most expensive components in a semi-conductive shielding composition.

It is understood that the semi-conductive insulation shielding composition of this invention can be prepared in any known or conventional manner and, if desired, can contain one or more other additives commonly employed in semi-conductive compositions with usual amounts. Examples of such additives include age resistors, processing aids, stabilizers, antioxidants, crosslinking inhibitors and pigments, fillers, lubricants, plasticizers, ultraviolet stabilizers, antiblock agents and flame retardant agents, and the like. The total amount of such additives which are normally encountered generally amounts to no more than about 0.05 to about 3 weight percent based on the total weight of the insulation shielding composition. For example, it is often preferred to employ from about 0.2 to about 1 weight percent based on the total weight of the insulation shielding composition of an antioxidant such as 4,4'thiobis-6-tert-butyl-meta-cresol, and from about 0.01 to about 0.5 percent by weight of a lubricant such as calcium stearate.

Thermoplastic or crosslinked polyolefin is the primary insulation of the high voltage electrical conductor, the semi-conductor composition being the external semi-conductive shielding for said insulation. Accordingly, a preferred embodiment of this invention may be more specifically described as an insulated electrical conductor covering containing as the primary insulation, thermoplastic or crosslinked polyolefin and as the external semi-conductive shielding for said insulation, the semi-conductive insulation shielding composition of this invention which has been previously defined above.

It is to be understood that the term "crosslinked polyolefin" as used herein includes compositions derived from a crosslinkable polyethylene homopolymer or a crosslinkable polyethylene copolymer such as ethylene-propylene rubber or ethylene-propylene-diene rubber insulations for electrical conductors. Normally, the preferred crosslinked polyolefin insulation is derived from a crosslinkable polyethylene homopolymer. It is to be further understood that said crosslinkable polyolefins used to form the crosslinked polyolefin substrates (e.g., primary insulation layer) can have number average molecular weights of at least about 15,000 up to about 40,000 or higher and a melt index of from about 0.2 to about 20 when measured according to ASTM D-1238 at 190° C. and thus are not the same nor should they be confused with the linear low density, low molecular weight polyethylene homopolymer additives or the ethylene-vinyl acetate compositions of this invention.

The use of articles of manufacture containing a shielding directly bonded to a crosslinked polyolefin substrate and the manner of their preparation are well known in the art. For instance, the present semi-conductive shielding composition can be extruded over a thermoplastic polyolefin substrate or, optionally, a cured (crosslinked) polyolefin substrate. Likewise, the use of polyethylene insulation compositions which, if desired, may contain conventional additives such as fillers, age resistors, talc, clay, calcium carbonate and other processing aides together with a conventional crosslinking agent are well known in the art. The insulated electrical conductors incorporating the present invention can be prepared by the previously described conventional methods of curing the insulation layer prior to contact with the semi-conductive insulation shielding composition. In general, it is considered desirable to prevent any premixing of the insulation composition prior to curing said compositions since such may allow the crosslinking agent to assert its influence on adhesion between the two layers through intercrosslinking across the interface of the two layers.

The insulated high voltage conductor prepared by use of the termoplastic semi-conductive composition is also considered to be within the scope of the present invention.

The following examples are illustrative of the present invention and are not to be regarded as limitative of the scope thereof. All parts, percentages and proportions referred to herein and in the appended claims are by weight unless otherwise indicated.

EXAMPLES

A semi-conductive thermoplastic resin composition was prepared on an industrial scale according to Formula A shown in Table I by blending in a conventional manner. Another composition, Formula B, was similarly prepared on an industrial scale according to the present invention which shows a portion of the ethylene-vinyl acetate copolymer replaced with LLDPE and a reduced amount of conductive component, carbon black.

TABLE I

| | Formula A | | Formula B | |
|---|---|---|---|---|
| Components | Wt. Parts | Wt. Percent | Wt. Parts | Wt. Percent |
| UE 630-02[1] | 88.24 | 57.6 | 66.18 | 45.30 |
| LPX 2[2] | — | — | 22.06 | 15.10 |
| LS 606[3] | 11.76 | 7.7 | 11.76 | 8.05 |
| XC-72[4] | 52.07 | 34.0 | 45.00 | 30.81 |
| Santonox[5] | 0.77 | 0.5 | 0.77 | 0.53 |
| Calcium Stearate (Lubricant) | 0.31 | 0.2 | 0.31 | 0.21 |
| TOTAL | 153.15 | 100.0 | 146.08 | 100.00 |

[1]Ethylene-vinyl acetate (EVA) copolymer containing 18 percent by weight vinyl acetate sold by U.S. Industrial Chemicals Co., a division of National Distillers and Chemical Corporation.
[2]Linear low density polyethylene sold by Exxon under Trademark.
[3]High density polyethylene having a specific gravity of about 0.96 g/cm³ sold by U.S. Industrial Chemicals Co., a division of National Distillers and Chemical Corporation.
[4]Carbon black sold by Cabot Corp. under Trademark.
[5]Antioxidant sold by Monsanto Company.

A series of electrical and mechanical tests were performed on samples of the batches prepared in accordance with Formulae A and B, the results of which are reported in Table II. These results make it abundantly clear that the test samples prepared according to the invention exhibit significantly lower heat distortion than those prepared according to Formula A, while at the same time increasing only insignificantly in conductive resistance. The insignificance of the increase is emphasized by the fact that in application a semi-conductive shielding layer need exhibit a volume resistivity of less than $50\times10^3$ ohm-cm. Moreover, this comparable conductance is, in fact, achieved with a reduced amount of conductive component including in the composition.

By substituting high crystalline linear low density polyethylene for a portion of the less crystalline EVA, one would expect a more rigid resin composition which would normally be characterized as more brittle at low temperature and less conducive to processibility, i.e., poorer melt flow properties. Upon inspection of the data, however, the amount of work required to process the samples of the invention as indicated in the Brabender readings is comparable to the work required to process the comparison samples. This unexpected feature of the present invention is of great importance to producers of high voltage cable end products in that less energy is required to process the semi-conductive composition by extrusion or other means.

Furthermore, the present composition compares favorably in low temperature brittleness to that of the Formula A samples. Only slightly decreased elongation was observed for the composition herein which was also unexpected because of the usual reduction in deformability which occurs upon inclusion of a portion of relatively higher crystalline LLDPE.

TABLE II

| Test | Results from Formula A | Results from Formula B |
|---|---|---|
| Brabender Measurement after | | |
| 2 minutes | 2700 meter-gr. | 2275 meter-gr. |
| 5 minutes | 2400 meter-gr. | 2040 meter-gr. |
| 20 minutes | 2175 meter-gr. | 1880 meter-gr. |
| Tensile Strength | | |
| Tensile psi | 1740 | 1670 |
| Aged 7 days at 100° C. (% retained) | 109 | 118 |
| Elongation % | 230 | 240 |
| Aged 7 days at 100° C. (% retained) | 95 | 92 |
| Low temperature Brittleness °C. | −25 | −34 |
| Volume Resistivity (ohm-cm) | 3.7 | 4.8 |
| Oven aged Volume Resistivity, at Room Temperature | 5.6 | 8.8 |
| 1 hr. 121° C. | 28 | 52 |
| 24 hrs. 121° C. | 19 | 33 |
| Room Temperature | 7 | 12 |
| 1 hr. 121° C. | 30 | 51 |
| Room temperature | 8 | 10 |
| Shore D initial | 57 | 57 |
| 10 seconds | 54 | 54 |
| Percent Heat Distortion | | |
| 110° C. 50 mil hot | 9.9 | 4.1 |
| 110° C. 70 mil hot | 11.8 | 2.4 |
| 121° C. 50 mil hot | 22.1 | 7.9 |
| 121° C. 70 mil hot | 25.5 | 7.5 |

Further samples were prepared on a laboratory scale according to Formulae C, D, and E shown on Table III. Formulae D and E are precisely the same except that in Formula E 22.06 parts of LLDPE have been substituted for that same amount of EVA in Formula D. Formula C is also similar to Formulae D and E, except that the amount of electrically conductive component, i.e., carbon black (XC-72), has been decreased in Formula D and E.

TABLE III

| | Formula C | | Formula D | | Formula E | |
|---|---|---|---|---|---|---|
| Components | Wt. Parts | Wt. % | Wt. Parts | Wt. % | Wt. Parts | Wt. % |
| UE 630-02[1] | 88.24 | 57.6 | 88.24 | 60.4 | 66.18 | 45.3 |
| LPX-2[2] | — | — | — | — | 22.06 | 15.1 |
| LS 606[3] | 11.76 | 7.7 | 11.76 | 8.1 | 11.76 | 8.1 |
| XC-72[4] | 52.07 | 34.0 | 45.00 | 30.8 | 45.00 | 30.8 |
| Santonox[5] | 0.77 | 0.5 | 0.77 | 0.5 | 0.77 | .5 |
| Calcium Stearate | 0.31 | 0.2 | 0.31 | 0.2 | 0.31 | .2 |
| TOTAL | 153.15 | | 146.08 | | 146.08 | |

[1]Ethylene-vinyl acetate (EVA) copolymer containing 18 percent by weight vinyl acetate sold by U.S. Industrial Chemicals Co., a division of National Distillers and Chemical Corporation.
[2]Linear low density polyethylene sold by Exxon under Trademark.
[3]High density polyethylene having a specific gravity of about 0.96 g/cm³ sold by U.S. Industrial Chemicals Co., a division of National Distillers and Chemical Corporation.
[4]Carbon black sold by Cabot Corp. under Trademark.
[5]Antioxidant sold by Monsanto Company.

Tests conducted on samples taken from Formulae C, D, E, the results of which are shown in Table IV, show, first of all, an insignificant increase in the working energy required for processing the composition of the invention; secondly, an improved low temperature brittleness; an increase in conductivity over the composition without the LLDPE (Formula D), and a conductance comparable to the composition which includes the greater amount of electrically conductive component; and finally, a dramatic reduction in percent heat distortion over both comparison formulae C and D as a result of the present invention. It is interesting to note that inclusion of the greater amount of the electrically conductive component, carbon black in Formula C, increases the working energy more than about 12% with only a minor improvement in heat distortion resistance compared to Formula D, so that the present invention, Formula E, surprisingly reduces the amount of work while effecting adequate conductance and improved heat distortion resistance.

TABLE IV

| Test | Formula C | Formula D | Formula E |
|---|---|---|---|
| Brabender Measurement after | | | |
| 2 minutes meter-gr. | 2550 | 2250 | 2275 |
| 5 minutes meter-gr. | 2375 | 2050 | 2075 |
| 20 minutes meter-gr. | 2225 | 1950 | 1950 |
| Tensile Strength | | | |
| Tensile psi | 1780 | 1970 | 1980 |
| Aged 7 days at 100° C. (% retained) | 107 | 100 | 99 |
| Elongation % | 290 | 340 | 310 |
| Low temperature Brittleness $F_{50}$ °C. | −43 | −42 | −45 |
| Volume Resistivity (ohm-cm) | 8 | 14 | 10 |
| Oven aged Volume Resistivity: | | | |
| 1 Hr. 121° C. | 33 | 99 | 66 |
| 24 hrs. 121° C. | 22 | 52 | 44 |
| Room temperature | 8 | 18 | 13 |
| 1 hr. 121° C. | 106 | 96 | 67 |
| Room temperature | 8 | 22 | 14 |
| Shore D initial | 58 | 58 | 61 |
| 10 seconds | 55 | 54 | 57 |
| Percent Heat Distortion: | | | |
| 110° C. 70 Mil Hot | 19.2 | 20.0 | 5.7 |
| 121° C. 70 Mil Hot | 28.2 | 29.9 | 3.5 |

Finally, compositions were made in accordance with Formulae F, G and H, shown in Table V on a laboratory scale, which are similar to Formulae C, D and E except that the base resin is ethylene-ethyl acrylate (EEA) copolymer rather than ethylene-vinyl acetate copolymer.

TABLE V

| Components | Formula F Wt. Parts | Formula F Wt. % | Formula G Wt. Parts | Formula G Wt. % | Formula H Wt. Parts | Formula H Wt. % |
|---|---|---|---|---|---|---|
| DFDA 5182[1] | 88.24 | 57.6 | 88.24 | 60.4 | 66.18 | 45.3 |
| LPX-2 | — | — | — | — | 22.06 | 15.1 |
| LS 606 | 11.76 | 7.7 | 11.76 | 8.1 | 11.76 | 8.1 |
| XC-72 | 52.07 | 34.0 | 45.00 | 30.8 | 45.00 | 30.8 |
| Santanox R | 0.77 | 0.5 | 0.77 | 0.5 | 0.77 | 0.5 |
| Calcium Stearate | 0.31 | 0.2 | 0.31 | 0.2 | 0.31 | 0.2 |
| TOTAL | 153.15 | | 146.08 | | 146.08 | |

[1]Ethylene-ethyl acrylate (EEA) copolymer containing ~18 weight-percent ethyl acrylate sold by Union Carbide Corporation.

The results of the tests performed on samples taken from compositions based on Formulae F, G and H, which are shown in Table VI, confirm the effectiveness of the present invention when employed in combination with an ethylene-acrylate ester comparable to its use with an EVA based resin composition.

TABLE VI

| Test | Formula F | Formula G | Formula H |
|---|---|---|---|
| Brabender Measurement after | | | |
| 2 minutes meter-gr. | 2650 | 2375 | 2500 |
| 5 minutes meter-gr. | 2425 | 2175 | 2280 |
| 20 minutes meter-gr. | 2275 | 2030 | 2170 |
| Tensile Strength | | | |
| Tensile psi | 1810 | 1730 | 1770 |
| Aged 7 days at 100° C. (% retained) | 105 | 100 | 102 |
| Elongation % | 240 | 310 | 315 |
| Aged 7 days at 100° C. (% retained) | 120 | 120 | 92 |
| Low temperature Brittleness $F_{50}$ °C. | −45 | −45 | −53 |
| Volume Resistivity (ohm-cm) | 6 | 12 | 11 |
| Oven aged Volume Resistivity: | | | |
| 1 Hr. 121° C. | 48 | 107 | 102 |
| 24 Hr. 121° C. | 30 | 56 | 61 |
| Room Temperature | 8 | 17 | 15 |
| 1 Hr. 121° C. | 49 | 104 | 101 |
| Room Temperature | 9 | 20 | 16 |
| Shore D Initial | 60 | 58 | 61 |
| 10 seconds | 56 | 54 | 57 |
| Percent Heat Distortion: | | | |
| 110° C. 70 Mil Hot | 8.4 | 12.9 | 3.7 |
| 121° C. 70 Mil Hot | 10.2 | 20.9 | 5.1 |

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A heat distortion-resistant non-crosslinked thermoplastic semiconductive composition comprising a copolymer selected from the group consisting of ethylene-vinyl acetate copolymer and ethylene-acrylate ester copolymer, an admixture of high density polyethylene and linear low density polyethylene and carbon black, said ethylene copolymer being present in an amount of from about 20 to about 60 weight percent, said admixture of polyethylene homopolymers being present in an amount of from about 10 to about 45 weight percent with the low density polymer constituting about 40 to about 75 percent of said admixture, all other percentages being based on the weight of the total composition and the carbon black concentration being present in a conductive amount.

2. The composition of claim 1 wherein the conductive component, carbon black, is present in said composition in an amount of from about 25 to about 35 percent by weight.

3. The composition of claim 1 wherein said admixture is present in an amount of from about 15 to about 35 percent by weight of said total composition.

4. The composition of claim 1 or 2 wherein said copolymer is ethylene-vinyl acetate copolymer containing vinyl acetate monomer in an amount of from about 7 to about 45 percent by weight based on the total weight of said copolymer.

5. The composition of claim 3 wherein the amount of said vinyl acetate monomer is from about 12 to about 28 percent by weight based on the total weight of said copolymer.

6. The composition of claim 4 wherein the amount of said vinyl acetate monomer is from about 17 to about 19 percent by weight based on the total weight of said copolymer.

7. The composition of claim 1 or 2 wherein said ethylene-vinyl acetate copolymer further contains a minor amount of one or more other monomers copolymerizable with ethylene and vinyl acetate.

8. The composition of claim 1 or 2 wherein said copolymer is ethylene-acrylate ester copolymer containing acrylate ester monomer in an amount of from about 7 to about 45 percent by weight based on the total weight of said copolymer.

9. The composition of claim 8 wherein the amount of said acrylate ester monomer is from about 12 to about 28 percent by weight based on the total weight of said copolymer.

10. The composition of claim 8 wherein the amount of said acrylate ester monomer is from about 17 to about 19 percent by weight based on the total weight of said copolymer.

11. The composition of claim 8 wherein said acrylate ester monomer is ethyl acrylate.

12. The composition of claim 8 wherein said acrylate ester monomer is methyl acrylate.

13. The composition of claim 12 wherein said percent by weight of linear low density polyethylene is from about 60 to about 70 percent by weight of said admixture of high density polyethylene and linear low density polyethylene.

14. The composition of claim 1 which further comprises an antioxidant in an amount of from about 0.2 to about 1.0 percent by weight based on the total weight of said composition.

15. The composition of claim 13 wherein said antioxidant is 4,4′-thiobis-6-tert-butyl-meta-cresol.

16. The composition of claim 1 which further comprises a lubricant in an amount of from about 0.1 to about 0.5 percent by weight based on the total weight of said composition.

17. The composition of claim 16 wherein said lubricant is calcium stearate.

18. An insulated electrical conductor comprising an electrically conductive core, a layer of insulative material immediately surrounding said core, and a semi-conductive shield comprising the composition of claim 1 surrounding said insulative layer.

19. The conductor of claim 18 wherein said core is a high voltage conductor.

20. The conductor of claim 18 or 19 wherein said insulative layer comprises a crosslinked polyolefin.

21. The conductor of claim 20 wherein said crosslinked polyolefin is crosslinked polyethylene.

* * * * *